United States Patent [19]

Conlon

[11] 4,322,260

[45] Mar. 30, 1982

[54] PROCESS FOR THE CONTINUOUS EXTRUSION FORMING OF A PLASTIC DOUBLE-WALLED FOAM-CORE CONDUIT

[75] Inventor: Lawrence E. Conlon, Westfield, Mass.

[73] Assignee: Monsanto Company, St. Louis, Mo.

[21] Appl. No.: 26,841

[22] Filed: Apr. 4, 1979

[51] Int. Cl.³ .............................................. B29D 23/04
[52] U.S. Cl. ............................... 156/244.12; 138/125; 138/126; 156/149; 156/244.13; 156/244.22; 156/244.23; 156/244.24; 264/45.9; 264/46.1; 264/46.9; 264/209.1
[58] Field of Search ...................... 156/77, 78, 79, 149, 156/244.11, 244.12, 244.13, 244.14, 244.22, 244.23, 244.24, 285; 264/45.8, 45.9, 46.1, 46.2, 46.5, 46.9, 173, 209; 138/125, 126, 149; 425/133.1

[56] References Cited

U.S. PATENT DOCUMENTS

| | | | |
|---|---|---|---|
| 3,118,800 | 1/1964 | Snelling | 156/244.12 |
| 3,399,095 | 8/1968 | Hyland | 264/46.9 |
| 3,547,162 | 12/1970 | Schserer | 138/126 |
| 3,599,677 | 8/1971 | O'Brien | 138/126 |
| 3,684,602 | 8/1972 | Bell | 156/149 |
| 4,125,585 | 11/1978 | Rosenbaum | 264/209 |
| 4,146,562 | 3/1979 | Fukushima et al. | 264/45.9 |

FOREIGN PATENT DOCUMENTS 2008223  5/1979  United Kingdom ................ 138/125

OTHER PUBLICATIONS

Plastic Technology, M. H. Naitove, "Now Co-Extrude Foam-Core ABS Pipe", 11/1978, pp. 50–52.

Primary Examiner—Caleb Weston
Attorney, Agent, or Firm—Joseph S. Nelson; William J. Farrington; Paul D. Matukaitis

[57] ABSTRACT

The invention relates to a process for the continuous extrusion forming of a thermoplastic double-walled, foam-core conduit by the sequential steps of extrusion forming an inner plastic tube, evenly coating said inner tube with foam-core layer and extrusion forming and bonding an outer tube in contact with said foam-core layer, said outer tube being generally evenly spaced apart from said inner tube by said foam-core layer providing a plastic double-walled, foam-core conduit.

24 Claims, 7 Drawing Figures

PROCESS FOR THE CONTINUOUS EXTRUSION FORMING OF A PLASTIC DOUBLE-WALLED FOAM-CORE CONDUIT

BACKGROUND OF THE INVENTION

Plastic double-walled, foam-core conduit having solid plastic inner and outer tubes and foamed core have been disclosed in published articles, e.g., "Modern Plastics", November, 1978 issue, pages 78–80.

Such pipes or conduits have been coextruded using a primary extruder for the foam-core layer or tube and a satellite extruder for the outer and inner skin tubes. The coextrusion die uses a feed block design with dual gate valves to control flow to the inner and outer skin tubes which are formed simultaneously around a foam-core layer or tube from the primary extruder in a common die.

Foam-core conduits have the advantage of being less dense without sacrificing properties, hence, savings in raw material and handling costs are realized.

As the art progessed the coextrusion process was found to have certain limitations, in particular, the density of the foam-core has been kept in the range of about 0.50 to 0.90 grams per cubic centimeter so that it would not collapse during its coextrusion with the inner and outer skins. The solid skin material is generally extruded at about 5° to 30° F. higher temperature than the foam-core layer, hence, when the three streams passed through the common profile die, the foam layer can be collapsed by the hotter skins or flow differentials.

There has developed a need for even lower density foam core pipe to further reduce raw material and energy costs consistent with optimized physical properties.

It is an objective of the present invention to provide a continuous process for the extrusion forming of double-walled, foam-core conduits wherein the foam-core layer has a density of 0.015 to 0.4 grams per cubic centimeter.

U.S. Pat. No. 3,379,221 relates to double-wall plastic conduits having a porous cementious fill material as a core layer incorporated after said double wall profile has been formed. U.S. Pat. No. 3,845,184 relates to a process for extrusion forming higher density foamed plastic extrudates having an annular profile and thin skins such that the tubular extrudate is self-supporting. The known prior art then relates to double-walled plastic conduits having high density foamed cores prepared by coextrusion.

SUMMARY OF THE PRESENT INVENTION

The present invention relates to a process for the extrusion forming of a plastic, double-walled, foam-core conduit having generally concentric inner and outer plastic tube walls generally evenly spaced apart and bonded by a plastic foam-core layer, said process comprising the continuous and sequential steps of:

A. extrusion forming said inner tube in a first extrusion means,

B. conveying said inner tube through a second extrusion means and extrusion coating an outer surface of said inner tube with an even coating of said foam-core layer, C. conveying said inner tube, coated with said foam-core layer, through a third extrusion means and extrusion forming said outer tube in contact with and bonded to said foam-core layer providing a plastic double-walled, foam-core conduit.

PREFERRED EMBODIMENTS

This invention is broadly applicable for forming plastic, double-walled, foam-core conduits. The profile can take the shape of a conduit having a central bore which can be annular, round, square, rectangular or of irregular shape.

Figure 1:
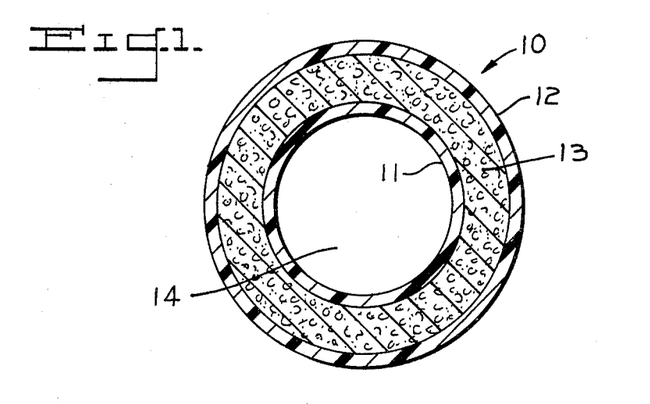
FIG. 1 is a cross-sectional view of a plastic, double-walled, foam-core conduit having a generally annular shaped profile.

Referring to the drawings, FIG. 1, a cross-sectional view of a plastic, double-walled, foam-core conduit 10, having inner tube 11, outer tube 12, foam-core layer 13 and central bore 14, said conduit 10, having a generally annular shaped profile in cross section.

Figure 2:
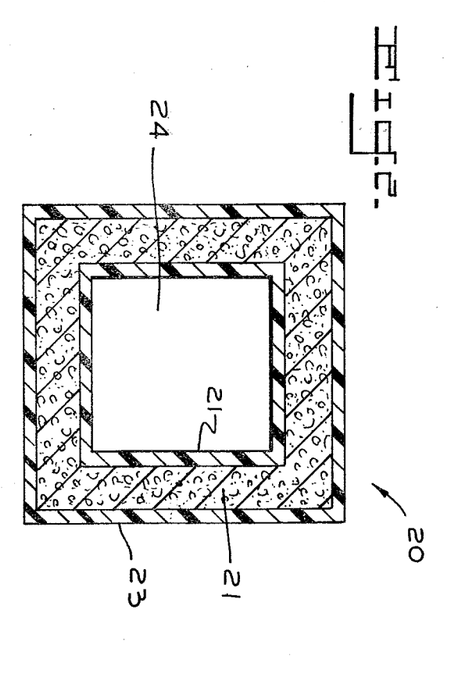
FIG. 2 is a cross-sectional view of a plastic, double-walled, foam-core conduit having a generally rectangular shaped profile.

FIG. 2, shows a cross-sectional view of a conduit 20 having inner tube 21, foam-core 22, and outer tube 23, said conduit having a cross-section being generally rectangular in profile.

Figure 3:
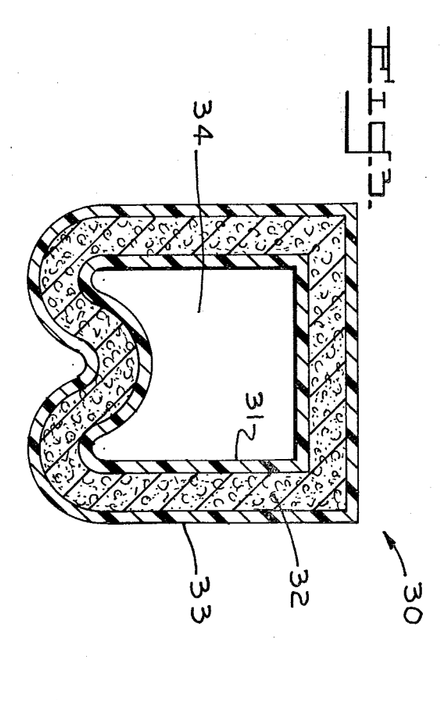
FIG. 3 is a cross-sectional view of a plastic, double-walled, foam-core conduit having an irregular shaped profile.

FIG. 3, shows a cross-sectional view of a conduit 30, having inner tube 31, foam-core layer 32, and outer tube 33, central bore 34, said conduit having an irregular shaped profile in cross-section.

Figure 4:
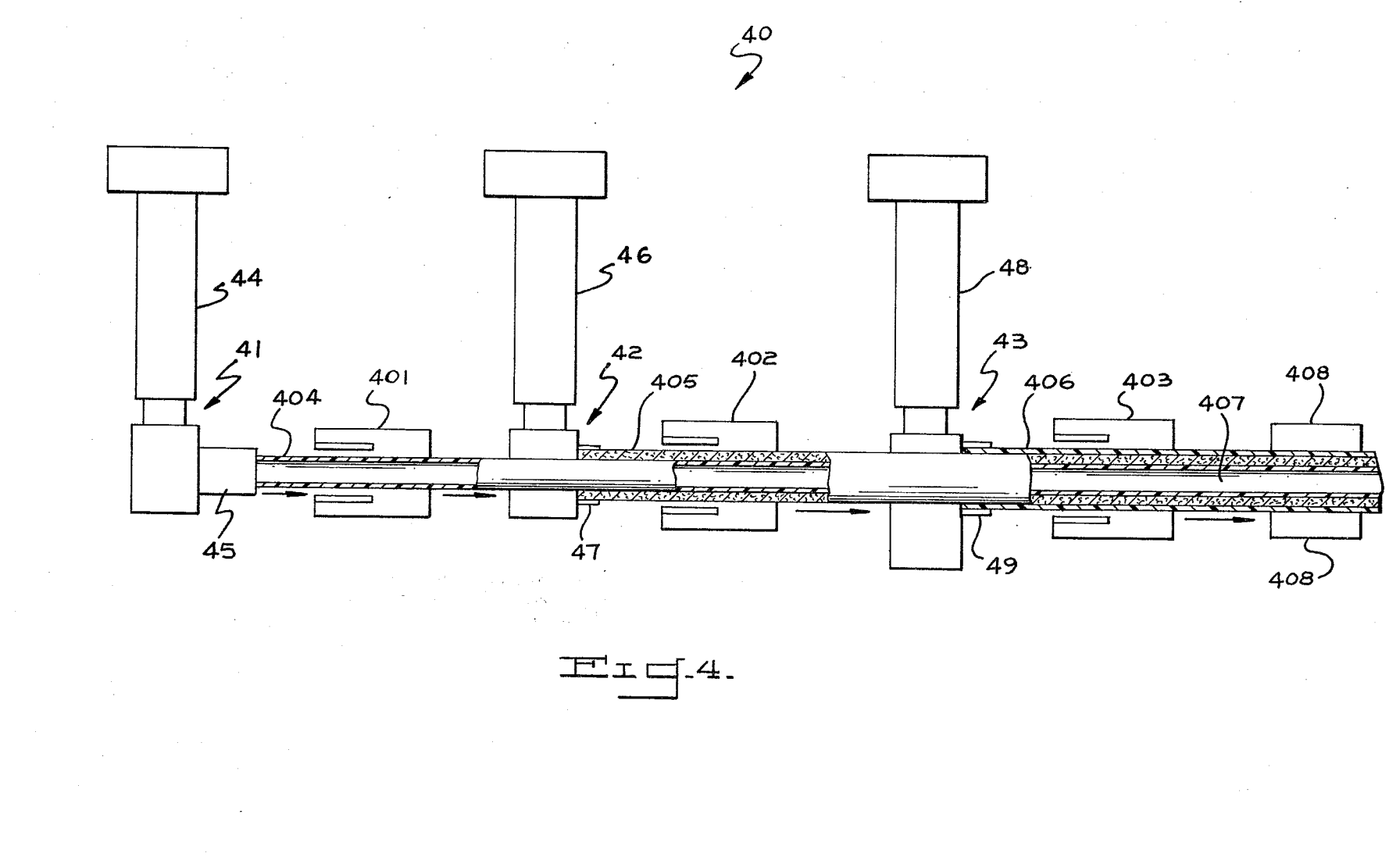
FIG. 4 is a schematic view of an extrusion line suitable for practicing the present invention.

FIG. 4, shows a schematic view of an extrusion line 40, for practicing the present invention having a first extrusion means 41, second extrusion means 42, and third extrusion means 43, said first extrusion means 41 having first extruder 44 and first die 45, said second extrusion means 42 having second extruder 46 and second die 47, said third extrusion means 43, having third extruder 48 and third die 49, said first sizing means being shown as 401, said second sizing means being shown as 402, and said third sizing means being shown as 403.

Said inner tube 404 is extruded by said first extrusion means 41, conveyed through said second extrusion means 42 and coated with said foam-core layer, said inner tube coated with said foam-core layer 405, is conveyed through said third extrusion means 43, forming said outer tube in contact and bonded to said foam-core layer forming said double-walled, foam-core conduit 406 having an axial bore 407, said conduit 406, being pulled by pipe or conduit puller 408.

Figure 5:
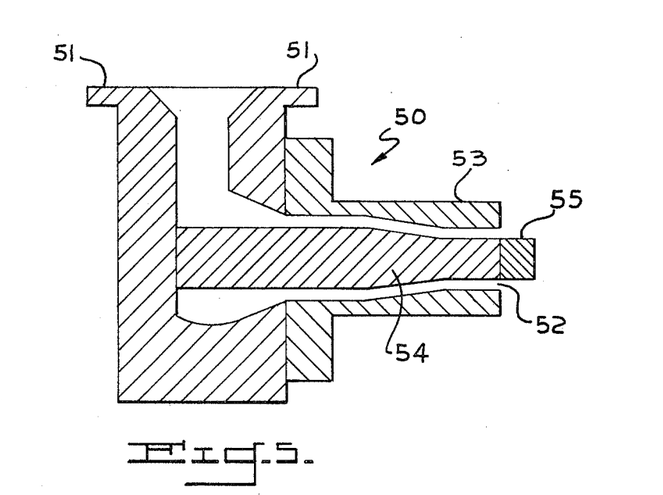
FIG. 5 is a cross-sectional view of a die assembly suitable for forming an inner plastic tube as part of a first extrusion means.

FIG. 5, shows a cross-sectional view of said first die 50, having flange 51 for attaching to said first extruder 44, having an open channel 52, having the shape of said inner tube, said open channel formed by a first bushing 53, and centrally disposed filler piece 54, having optional filler piece extension 55 for carrying inner tube on exiting from die to said sizing means.

Figure 6:
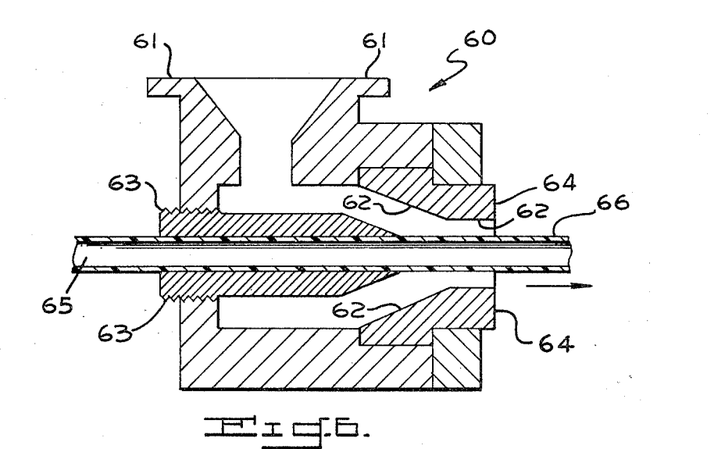
FIG. 6 is a cross-sectional view of a die assembly suitable for coating said inner tube with said foam-core layer in a second extrusion means.

FIG. 6, shows a cross-sectional view of die 60, adaptable for operating as said second die, having a flange 61, for attaching to said second extruder 46, having an open channel 62, formed by a centrally disposed first fixed mandrel 63, forming one face of said open channel in cooperation with a second bushing 64, said first fixed mandrel having centrally disposed opening 65 having the general shape of said inner tube 66, for carrying said tube through said die 60, said first fixed mandrel 63, extending partially through said die such that said inner tube becomes a first moving mandrel 66, on exiting said first mandrel 63 such that moving mandrel 66 becomes coated with said foam-core layer on passing through die 60 feed with a melt or a foamable melt of said plastic fed through said open channel 62 of die 60.

Figure 7:
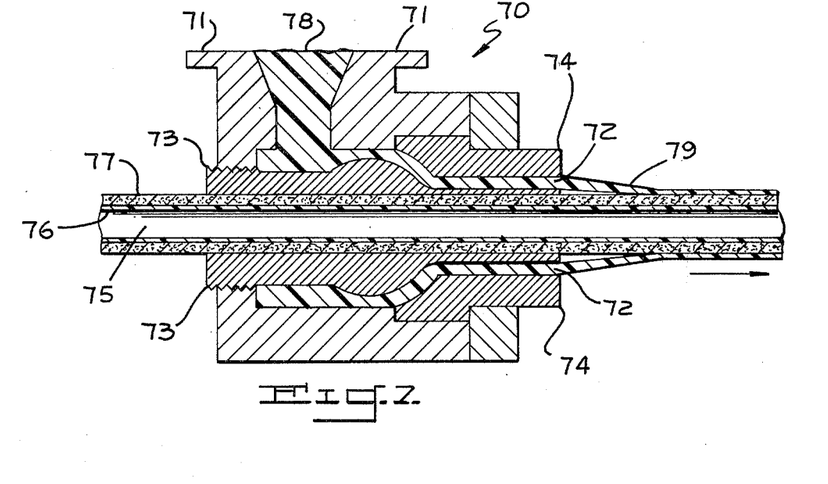
FIG. 7 is a cross-sectional view of a die assembly suitable for extrusion forming said outer tube in contact with and bonded to said foam-core layer providing a double-walled, foam-core conduit.

FIG. 7, shows a cross-sectional view of a die 70, adaptable for operating as a third die, having a flange 71, for attaching to said third extruder 48, having an open channel 72, formed by a centrally disposed second fixed mandrel 73, forming one face of said open channel in cooperation with a third bushing 74, said second fixed mandrel having a centrally disposed opening 75, having the general shape of an inner tube 76 coated with a foam-core layer 77, said open channel 72 carrying a plastic melt 78 formed into outer tube 79 by said die 70, said outer tube being drawn down in contact with and bonded to said foam-core layer 77 by said inner tube coated with said foam core layer as a second moving mandrel.

The plastic used in forming said double-walled, foam-core, conduit can be a thermoplastic formed from monomers selected from the group consisting of alkenyl aromatic, alkenyl nitrile, maleic anhydride, butadiene, ethylene, propylene, vinyl choride, acrylic, acrylate and mixtures thereof.

The preferred plastic to be used in said conduit is polystyrene, styrene-acrylonitrile copolymer, styrene-maleic anhydride copolymer, butadiene rubber reinforced plastic thereof and mixtures thereof.

The rubber reinforced polymers of polystyrene are known as high impact polystyrene or HIPS polyblends. The rubber reinforced polymers of styrene-acrylonitrile polymers are known as ABS polyblends. The ABS polyblends can be prepared by the processes disclosed in U.S. Pat. Nos. 3,509,237 and 3,509,238. The high impact polystyrene polyblends (HIPS) can be prepared by the process disclosed in U.S. Pat. No. 3,903,202. The patents are incorporated by reference.

THE ABS POLYBLENDS

The interpolymers of the present invention of both the matrix and the graft superstrates consist at least principally of a monovinylidene aromatic hydrocarbon (alkenyl aromatic) and an unsaturated nitrile (alkenyl nitrile), i.e., such monomers comprise at least 50.0% by weight and preferably at least 75.0% by weight of the interpolymers. Most desirably, such monomers comprise at least 90.0% by weight of the interpolymer and the usual commercial compositions are substantially completely comprised of such monomers although minor amounts, i.e., less than 5.0% by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties, and, accordingly, it is desirable that the superstrates of both graft copolymers closely approximate each other. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated that deviations in the composition of the interpolymers of the matrix and superstrates such as different monomers and/or ratios may be desirable for some applications and that some deviations may inherently occur as a result of process variables.

Exemplary of the monovinylidene aromatic hydrocarbons which may be used in the interpolymers are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted haolstyrenes, e.g. o-chlorostyrene, p-chlorostyrene, o-bromostyrene, 2,4-dichlorostyrene, etc.; ring-alkyl, ring-halosubstituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolymers are acrylonitrile, methacrylonitrile, ethacrylonitrile and mixtures thereof.

Exemplary of the monomers which may be interpolymerized with the monovinylidene aromatic hydrocarbons and unsaturated nitriles are conjugated 1,3 dienes, e.g., butadiene, isoprene, etc.; alpha-or beta-unsaturated monobasic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc,; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc., and maleic acid. As is known in the art, the amount of these comonomers which may be included in the interpolymer will vary as the result of various factors.

In addition, the monomer formulation at the time of polymerization may include a preformed polymer or a partially polymerized material such as a partially polymerized monovinylidene aromatic hydrocarbon or interpolymer thereof.

The polymerizable monomer mixtures contain at least 50% by weight of the monovinylidene aromatic monomer and preferably at least 60% by weight thereof. They also contain at least 5% by weight of the unsaturated nitrile and preferably at least 15% by weight thereof. From the standpoint of highly advantageous commercial practice, the monomer formulations contain 50 to 95% and preferably 50 to 85%, by weight of the vinylidene aromatic hydrocarbon and 50 to 5%, and preferably 15 to 50%, by weight of the unsaturated nitrile.

THE MATRIX

As is well known in the art, the polyblend is produced by polymerizing the monomers in the presence of the preformed rubber. It is believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100% grafting efficiency is not usually attainable, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber and the conditions of polymerization. Generally, interpolymers prepared without the inclusion of rubber will be compounded with material from the graft polymerization reactions to obtain the desired composition.

Any of the usual polymerization processes may be used to effect polymerization of the ungrafted superstrate, i.e., mass suspension and emulsion, or combinations thereof. Such techniques are well known and are also described herein with respect to the graft copolymerization reactions.

THE RUBBER SUBSTRATE

Various rubbers onto which the interpolymer may be grafted during the polymerization in the presence thereof are utilizable as the substrate of the graft copolymer including diene rubbers, ethylenepropylene rubbers, acrylate rubbers, polyisoprene rubbers and mixtures thereof as well as interpolymers thereof with each other or other copolymerizable monomers.

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D-746-52T) of one or more conjugated 1,3 dienes, e.g., butadiene, isoprene, piperlyene, chloroprene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vknyl and vinylidene chlorides and bromides, etc.); and the like.

Although the rubber may contain up to about 2% of a crosslinking agent, based on the weight of the rubber-forming monomer or monomers, crosslinking may present problems in dissolving the rubber in the monomers for the graft polymerization reaction, particularly for a mass or suspension polymerization reaction. In addition, excessive crosslinking can result in loss of the rubber characteristics. The crosslinking agent can be any of the agents conventionally employed for crosslinking diene rubbers, e.g., divinylbenzene, diallyl maleate, diallyl fumarate diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 75 to 100% by weight of butadiene and/or isoprene and up to 25% by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95% by weight butadiene and 5 to 10% by weight of acrylonitrile or styrene.

Various techniques are customarily employed for polymerizing rubber monomers including mass, suspension and emulsion polymerization. Emulsion polymerization can be used to produce a latex emulsion which is useful as the base for emulsion polymerization of the graft copolymer.

GRAFT POLYMERIZATION PROCESS

The graft copolymers are prepared by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30-200:100 and most desirably about 70-150:100. With graft ratios above 30:100, a highly desirable degree of improvement in various properties generally is obtained.

To minimize requirements for separate equipment, the same process of polymerization desirably may be utilized to prepare both sizes of rubber graft components, as well as ungrafted interpolymer or crystal for use as the matrix when required. Generally, the particle sizes of the graft copolymer can be varied by varying the size of the rubber substrate employed. For example, a rubber latex which will usually have a relatively small particle size, i.e., less than about 0.2 micron, may be creamed through the use of polyvalent metal salts to obtain agglomeration or coagulation of a number of the small rubber particles into a larger mass. During the grafting reaction, the polymerizing monomers will graft onto this agglomerate and thus provide a graft copolymer of larger size. In addition, seeding techniques during polymerization of the rubber and/or during the polymerization of the graft copolymers may be utilized to vary the size of the particles thus produced.

Chain transfer agents or molecular weight regulators also exhibit an effect upon the size of the graft copolymer produced, particularly in mass and suspension polymerization reactions. The effect of the rate of addition of chain transfer agents will be referred to hereinafter. The viscosity of the polymerizing mixture also tends to affect the condensate particle size of the polymers.

To some extent, crosslinking and the ratio of the superstrate to substrate in the graft copolymer tend to affect the particle size of the graft copolymers by reason of an apparent tendency for the particles to aggregate or agglomerate as the amount of grafting and/or crosslinking becomes minor.

The graft copolymer particles produced in various polymerization processes may be agglomerated through various techniques in the recovery thereof such as during the coagulation and/or dewatering techniques. Heat and other conditions of polymerization such as catalysts monomer ratios, rate of addition of monomers, etc., also tend to affect the particle size of the graft copolymers produced thereby.

However, different polymerization techniques may be utilized to produce the two different sizes of graft copolymer particles by reliance upon inherent process characteristics. In practice, it has been found desirable to utilize an emulsion polymerization process to form the smaller graft particles and a mass-suspension polymerization process to form the larger particles since highly spherical particles are produced within a relatively narrow size range. Generally, the graft copolymerization inherently produces crosslinking, and this may be enhanced by selection of process conditions to ensure discreteness of the graft copolymer particles.

It will be appreciated that both the large and small particle graft copolymer components may be provided by mixtures of two or more separately formed graft copolymers of distinctive properties to vary still further the benefits of the present invention. For example, the small particle graft copolymer may be a cocoagulation of two different graft copolymer latices having different superstrate to substrate ratios, or the large particle graft copolymers may be formed by two different suspension products with varying superstrate to substrate ratios.

The emulsion grafted diene rubbers have an average particle size diameter of about 0.005 to 0.30 microns, preferably 0.01 to 0.25 microns, most preferably 0.10 to 0.20 microns. If the rubber particles are agglomerated before grafting the average particle size diameter can be increased to 0.30 to 0.80 microns in size and then grafted and stabilized at that size range. The mass-suspension prepared grafted rubber particles have an average particle size diameter of 0.80 to 2.0 microns, preferably 0.90 to 1.5 microns. It has been found that the mass polymerized grafted rubber particles have occluded interpolymer inside the rubber particle as well as grafted interpolymer superstrate. The combined occluded and grafted interpolymer can be from 0.1 to 5 parts per part of rubber whereas the grafted superstrate is contained in amounts of from about 0.10 to 2.5 parts per part of rubber.

FORMATION OF THE ABS POLYBLEND

The polyblends can be blends of the emulsion grafted rubber copolymer particles with matrix interpolymer or blends of mass-suspension grafted rubber copolymer particles with matrix interpolymer. A third type of blend can be used wherein two different emulsion grafted rubber copolymers having different amounts of grafted superstrate are blended with matrix interpolymers as in U.S. Pat. No. 3,509,238. The polyblends can also be blends of the emulsion grafted rubber particles with mass-suspension grafted particles which are then blended with matrix interpolymer to form polyblends as in U.S. Pat. No. 3,509,237. The polyblends can be prepared by dry blending the grafted rubber copolymers with the matrix interpolymers followed by melt colloiding in an extruder, banbury or roll mill at temperatures of 400° to 500° F. (205° to 260° C.).

The ABS polyblends can contain 1.0 to 70% of the grafted rubber copolymers based on the weight of the polyblend depending on the physical properties desired in the conduit.

HIPS POLYBLEND

The high impact polystyrene polyblends (HIPS) can be prepared by the process disclosed in U.S. Pat. No. 3,903,202.

POLYMERIZABLE MONOMER COMPOSITION

The monomer composition charged to the first reaction zone comprises at least one monoalkenyl aromatic monomer of the formula where Ar is selected from the group consisting of phenyl, halophenyl alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-dimethyl-2,5-di(tert-butylperoxy)hexane, 2,5-dimethyl-2,5-di(tert-butylperoxy) hexane-3, or hexyne-3, tert-butyl hydroperoxide, cumene hydroperoxide, p-menthane hydroperoxide, cyclopentane hydroperoxide, pinane hydroperoxide, 2,5-dimethylhexane, 2,5-dihydroperoxide, etc., and mixtures thereof.

The catalyst is generally included within the range of 0.001 to 3.0% by weight, and preferably on the order of 0.095 to 1.0% by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0% by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

THE RUBBER SUBSTRATE

Exemplary of the various rubbers onto which the polymerizable monomer formulation can be grafted during polymerization in the presence thereof to produce the graft copolymers are diene rubbers, natural rubbers, ethylene-propylene terpolymer rubbers, acrylate rubbers, polyisoprene rubbers and mixtures thereof, as well as interpolymers thereof with each other or other copolymerizable monomers.

The preferred substrates, however, are diene rubbers (including mixtures of diene rubbers), i.e., any rubbery polymer (a rubbery polymer having a second order transition temperature not higher than 0° centigrade, preferably not higher than −20° centigrade, as determined by ASTM Test D-746-52T) of one or more of the conjugated, 1,3 dienes, e.g. butadiene, isoprene, 2-chloro-1,3-butadiene, 1 chloro, 3-butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butyl-styrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; arcylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearage, etc.); vinyl and vinylidene halides (e.g. the vinyl and vinylidene chlorides and bromides, etc.); and the like.

Although the rubber may contain up to about 2.0% of a crosslinking agent, based on the weight of the rubber-forming monomer or monomers, crosslinking may present problems in dissolving the rubber in the monomers for the graft polymerization reaction. In addition, excessive cross-linking can result in loss of the rubber characteristics.

A preferred group of rubbers are the stereospecific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° to −105° C. as determined by ASTM Test D-746-52T.

GRAFTED RUBBER PHASE

A monomer composition comprising at least one monoalkenyl aromatic monomer having about 2–20% by weight of a diene rubber dissolved therein is charged continuously as a monomer-rubber solution to the initial reaction zone. The monomer is polymerized at temperatures of about 110°–145° C. in the first zone converting about 10–50% by weight of the monomer to a alkenyl aromatic polymer, already described, as a first polymer. At least a portion of the first polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

The remainder of the first polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 2 to 15% by weight diene rubber disperses almost instantaneously, under stirring, forming the rubber-monomer particles which on complete polymerization form discrete rubber particles. The conversion of monomers to polymers in the first reaction zone is controlled between 10–50% and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a first polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 2 to 15% as used in the present invention. The impact strength is also determined by the size of the dispersed rubber particles, with the larger particles providing higher impact strength in the range of 0.5 to 10 microns measured as a weight average particle size diameter with a photosedimentometer by the published procedure of Graves, M. J., et.al., "Size Analysis of Subsieve Powders Using a Centrifugal Photosedimentometer", British Chemical Engineering 9:742–744 (1964). A Model 3000 Particle Size Analyzer from Martin Sweets Co., 3131 West Market Street, Louisville, Ky. was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\frac{\% \text{ Dry Gel}}{\text{in Polyblend}} = \frac{\text{Weight of dry gel}}{\text{Weight of polyblend}}$$

$$\left.\begin{array}{l}\% \text{ Graft and} \\ \text{Occlusions} \\ \text{in Rubber}\end{array}\right\} = \frac{\% \text{ dry gel} - \% \text{ rubber}}{\text{Percent rubber*}}$$

$$\left.\begin{array}{l}\text{Parts** by weight} \\ \text{of graft polymer} \\ \text{and occluded poly-} \\ \text{mer per unit weight} \\ \text{of rubber}\end{array}\right\} = \frac{\% \text{ dry gel} - \% \text{ rubber}}{\text{Percent rubber}}$$

*Percent rubber determined by infra red spectrochemical analysis of the dry gel
**The present invention preferably has present about 0.5 to 5 grams of occluded and grafted polymer per gram of the diene rubber particle.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C., and weighed.

$$\text{Swelling Index} = \frac{\text{weight of dry gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

Step (A) is carried out by extruding a melt of a plastic through an open channel of a first die of said first extrusion means, having the shape of said inner tube, forming a molten tube, carrying said molten tube through a first sizing means and cooling as said inner tube, said sizing means being a vacuum sizing means.

The extrusion means, dies, vacuum sizing means as shown in FIGS. 4, 5 and 6 are commercially available from the Prodex, HPM Division, Koehring Co., Mount Gilead, Ohio and can be adapted to the present process.

Step (B) is carried out by extruding a melt of a plastic, having present a blowing agent, through an open channel of a second die of said second extrusion means as a foamed extrudate while passing simultaneously said inner tube through said second die, coating the outer surface of said inner tube evenly with said foamed extrudate as said foam-core layer followed by sizing and cooling said foam-core layer. Said open channel of said second die has a first fixed mandrel centrally disposed therein, said mandrel forming one face of said open channel, said first fixed mandrel having a centrally disposed opening running axially through said mandrel having the general shape of said inner tube for carrying said inner tube through said die, said first fixed mandrel extending partially through said die, such that said inner tube becomes a first moving mandrel, on exiting said first fixed mandrel and is evenly coated with said foamed extrudate on passing through said second die, said foam-core layer is sized to be radially uniform in thickness concentric with said inner tube. Said foam-core layer is sized optionally with a second vacuum sizing means or mechanical sizing means.

Step (C) is carried out by extruding a melt of a plastic through an open channel of a third die of said third extrusion means having the general shape of said profile while passing simultaneously said inner tube, having said foam-core layer in place, through the open channel of said third die, extrusion forming said plastic melt as said outer tube in contact with said foam-core layer, said outer tube being generally evenly spaced apart from said inner tube by said foam-core layer providing a double-walled, foam-core conduit. Said outer tube is sized optionally with a third vacuum sizing means.

The foam-core layer is formed from an extrusion melt of said plastic having present a blowing agent selected from the group consisting of hexane, petroleum ether, $CO_2$, halogenated hydrocarbons or mixtures thereof in an amount of about 0.1 to 10.0 weight percent based on said plastic.

The foam-core layer can also be formed from an extrusion melt of said plastic having present a chemical blowing agent selected from the group consisting of azodicarbonamide, diazoaminobenzene, 1,3-di-phenyl triazine, 1,1'-azo-bis-formamide, 2-2'-azoisobutyronitrile, azo-hexahydrobenzonitrile, benzene sulfonylhydrazide, sodium bicarbonate, ammonium carbonate and mixtures thereof in an amount of about 0.1 to 10.0% by weight based on said plastic.

The foam-core layer has a density of about 0.015 to 0.5 g/cc. wherein Step (B) is carried out with extrusion at a melt temperature of about 125° to 250° C. and a pressure of about 60 to 270 atm providing a foam-core thickness of about 20 to 5000% of a combined wall thickness of the inner and outer tubes.

Steps (A) and (C) are carried out with extrusion at a melt temperature of about 175° to 260° C. and a pressure of about 60 to 204 atm providing an inner tube thickness of about 0.025 to 1.25 cm. and an outer wall thickness of about 0.025 to 1.25 cm.

The bonding of the inner tube to the foam-core layer can be carried out by heating the outside surface of said inner tube prior to coating with said foam-core layer in Step (B). The heating is carried out by heating only the outside surface with a suitable heater which can be, e.g., a heated sleeve forming an inner surface of said first mandrel such that the outside surface of said inner tube is heated to about 130° to 230° C. prior to coating with said foam-core layer. The bonding of the foam-core layer to the outer surface of said inner tube can be carried out by coating the outer surface of said inner tube with an active solvent for said inner tube prior to conveying through said second extrusion means, said active solvent can be selected, e.g., from the group consisting of methyl ethyl ketone, xylene, toluene, petroleum ether, hexane, pentane or mixtures thereof.

The following Example is illustrative of the process and is not to be construed as limiting the scope and spirit of the invention.

EXAMPLE 1

An ABS polyblend having a rubber content of about 23% was melt extruded through a first extrusion means at 425° F. (220° C.) and a pressure of about 2000 psi (140 atm.) to form a inner tube, vacuum sized and cooled to an inside diameter of about 1.5" (3.75 cm) and a wall thickness of about 100 mil (0.250 cm). The inner tube was conveyed by a pipe puller means from said first extrusion means through a second extrusion means wherein an ABS polyblend having a diene rubber content of about 4% dry blended with about 0.5% talc, 1.0% ionomer lubricant (Surlyn 1801 commercially available from DuPont, Wilmington, Del.) and 0.1% gelatin, all said additives based on said ABS polyblend. Said dryblend was melt extruded at about 275° F. (135° C.) and 2000 psi (140 atm.) while injecting about 5 parts of Freon 12 (dichlorodifluoromethane commercially available from DuPont, Wilmington, Del.) per 100 parts of ABS, into said melt in the second extruder of said second extrusion means. An annular foam-core layer was extruded in contact with the outer surface of said inner tube acting as a moving mandrel and allowed to foam radially to about 1" (2.5 cm) in thickness and a density of about 4 lbs./cu.ft. (0.064 gms./c.c.). The inner tube having said foam-core layer was conveyed through a heated annular sleeve sizing means, cooled and conveyed to a third extrusion means by said pipe puller, said third extrusion means extruding a melt of ABS plastic under the same conditions and having the same properties as extruded in said first extrusion means forming an outer tube of said ABS plastic having an inside diameter slightly larger than said first tube coated with said foam-core layer such that said first tube having said foam-core acts as a moving mandrel picking up said outer tube as it shrinks in contact with said foam-core layer and becomes bonded thereto. Said outer tube can be extruded at a rate slightly slower than said inner tube such that as said second tube shrinks in diameter to contact said foam-core layer, it is drawn down in diameter to contact and bond to said foam-core layer. The relative rates of extrusion of said inner and outer tubes are predetermined so as to provide an outer layer of a predetermined thickness in contact and bonded to said foam-core layer. Said outer tube was formed with a final thickness of about 0.100" (0.250 cm) in contact and bonded to said foam-core layer providing a double-walled foam-core conduit which was conveyed through a spray bath, cooled and cut to length. The example was carried out as a continuous operation such that said inner tube, said foam-core layer and said outer tube were formed sequentially but continuously providing a continuous process for forming said conduit.

The plastic used in the inner and outer tubes and the foam-core layer of the double-walled conduit can be of the same plastic or different plastics can be used for the inner tube, the outer tube or the foam-core layer.

Several plastics suitable for the process and conduit have been disclosed supra. These are generally known as thermoplastics. The monomers disclosed include alkenyl aromatic, alkenyl nitrile, maleic anhydride, butadienes, ethylenes, propylenes, vinyl chloride, acrylic and acrylate or other vinyl or vinylidene type monomers which can be polymerized by free radical catalysts. These monomers can be used to prepare thermoplastics such as polystyrene, styrene copolymers having the comonomers of acrylonitrile, methacrylonitrile, esters of acrylic or methacrylic acid e.g., methyl acrylate, ethyl acrylate, methyl methacrylate, ethyl methacrylate, vinyl acetate, vinyl chloride, butadiene, isoprene, chloroprene, ethylene, propylene and other olefins, maleic acid and its derivatives. The alkenyl aromatic monomers include those disclosed for ABS and HIPS polyblends. The alkenyl aromatic monomers include those disclosed for ABS polyblends. Other polymers that can be prepared from the disclosed monomers are polyethylene, polypropylene, polyvinyl chloride, polymethyl methacrylate, polyacrylic acid, polybutadiene, polymaleic acid and their copolymers with the monomer disclosed. The process of this invention can be adapted to the use of a wide variety of other conventional thermoplastics known in the art, e.g., polycarbonates, polyesters, polyethers, polysulfones, polyamides, polyacetals or polyblends of such thermoplastics with ABS and HIPS for improved toughness.

Generally, such conduits are used for nonpressure-type sewer and drain pipe, utility ducts or conduits and DWV (drain, water and vent) pipes.

Fire retardant properties may be incorporated in such conduits by conventional means such as incorporating halogenated compounds, metal oxides and other inorganic fillers. Halogenated monomers can be used as comonomers n sufficient amounts to provide fire-retarding properties in the plastics used.

The blowing agents are not limited to those disclosed supra. Any conventional blowing agent can be used for forming the foam-core layer that is active within the temperature range which the plastic is extruded.

The conduit configuration can be prepared such that the inner and outer tubes have the same wall thickness or different wall thicknesses within the thickness ranges disclosed supra.

The conduit configuration can be varied. Increasing the wall thickness of the inner tube generally provides greater impact strength for the conduit whereas increasing the thickness of the outer tube generally increases flexural strength or stiffness of the conduit. Stiffness can also be increased by increasing the thickness of the foam-core layer. Hence, a range of physical properties can be provided for double-walled, foam-core conduit without changing overall density and dimensions of the conduit.

What is claimed is:

1. A process for the extrusion forming of a double-walled, foam-core conduit having generally concentric inner and outer plastic tube walls generally evenly spaced apart and bonded by a foam-core layer, said conduit including said tube walls and said foam core layer being formed from a plastic that is a thermoplastic, said process comprising the continuous and sequential steps of:
   A. extrusion forming said inner tube wall in a first extrusion means,
   B. conveying said inner tube through a second extrusion means and extrusion coating an outer surface of said inner tube with an even coating of said foam-core layer having a density of about 0.015 to 0.4 g./c.c.,
   C. conveying said inner tube, coated with said foam-core layer, through a third extrusion means and extrusion forming said outer tube wall in contact with and bonded to said foam-core layer providing a plastic double-walled, foam-core conduit.

2. A process of claim 1 wherein said inner and outer tube walls are generally annular in profile providing a double-walled, foam-core pipe.

3. A process of claim 1 wherein said inner and outer tube walls are generally rectangular in profile providing a double-walled, foam-core rectangular conduit.

4. A process of claim 1 wherein said inner and outer tube walls are irregular shaped generally concentric profiles providing a double-walled conduit.

5. A process of claim 1 wherein said plastic is formed from monomers selected from the group consisting of alkenyl aromatic, alkenyl nitrile, maleic anhydride, butadiene, ethylene, propylene, vinyl chloride, acrylic, acrylate and mixtures thereof.

6. A process of claim 1 wherein said plastic is polystyrene, styrene-acrylonitrile copolymer, styrene-maleic anhydride copolymer, butadiene rubber reinforced plastic thereof and mixtures thereof.

7. A process of claim 1 wherein step (A) is carried out by extruding a melt of said plastic through an open channel of a first die of said first extrusion means, having the shape of said inner tube, forming a molten tube, carrying said molten tube through a first sizing means and cooling as said inner tube.

8. A process of claim 1 wherein step (C) is carried out by extruding a melt of said plastic through an open channel of a third die of said third extrusion means having the general shape of said profile while passing simultaneously said inner tube, having said foam-core layer in place, through the open channel of said third die, extrusion forming said plastic melt as said outer tube in contact with said foam-core layer, said outer tube being generally evenly spaced apart from said inner tube by said foam-core layer providing a double-walled, foam-core conduit.

9. A process of claim 8 wherein said open channel of said third die having a second fixed mandrel centrally disposed therein, said second fixed mandrel forming one face of said open channel and having a centrally disposed opening running axially through said second fixed mandrel having the general shape of said inner tube, coated with said foam-core layer for carrying said coated tube through said third die, said second fixed mandrel extending through said third die such that said coated inner tube becomes a second moving mandrel on exiting said second fixed mandrel, extrusion forming and bonding said outer tube in contact with said foam-core layer, said outer tube being generally evenly spaced from said inner tube by said foam-core layer providing a double-walled, foam-core conduit.

10. A process of claim 1 wherein said foam-core layer is formed from an extrusion melt of said plastic having present a blowing agent selected from the group consisting of hexane, petroleum ether, $CO_2$, halogenated hydrocarbons or mixtures thereof in an amount of about 0.1 to 10.0 weight percent based on said plastic.

11. A process of claim 1 wherein said foam-core layer is formed from an extrusion melt of said plastic having present a chemical blowing agent selected from the group consisting of azodicarbonamide, diazoaminobenzene, 1,3-diphenyl triazine, 1,1'-azo-bis-formamide, 2-2'-azo-isobutyronitrile, azo-hexahydrobenzonitrile, benzene sulfonylhydrazide, sodium bicarbonate, ammonium carbonate and mixtures thereof in an amount of about 0.1 to 10.0% by weight based on said plastic.

12. A process of claim 1 wherein said inner tube has a wall thickness of about 0.025 to 1.25 cm., said outer tube has a wall thickness of about 0.025 to 1.25 cm. and said foam-core layer has a thickness of about 30 to 5000% of a combined wall thickness of said inner and outer tubes.

13. A process for the extrusion forming of a double-walled, foam-core conduit having generally concentric inner and outer plastic tube walls evenly spaced apart and bonded by a foam-core layer, said conduit including said tube walls and said foam core layer being formed from a plastic that is a thermoplastic, said process comprising the continuous and sequential steps of:
   A. extrusion forming said inner tube wall in a first extrusion means,
   B. conveying said inner tube through a second extrusion means and extrusion coating an outer surface of said inner tube with an even coating of said foam-core layer having a density of about 0.015 to 0.4 g./c.c., C. conveying said inner tube, coated with said foam-core layer, through a third extrusion means and extrusion forming said outer tube wall in contact with and bonded to said foam-core layer providing a plastic double-walled, foam-core conduit, wherein step (A) is carried out by extruding a melt of said plastic through an open channel of a first die of said first extrusion means, having the shape of said inner tube, forming a molten tube, carrying said molten tube through a first sizing means and cooling as said inner tube wherein said sizing means is a first vacuum means.

14. A process for the extrusion forming of a double-walled, foam-core conduit having generally concentric inner and outer plastic tube walls evenly spaced apart and bonded by a foam-core layer, said conduit including said tube walls and said foam core layer being formed from a plastic that is a thermoplastic, said process comprising the continuous and sequential steps of:
A. extrusion forming said inner tube wall in a first extrusion means,
B. conveying said inner tube through a second extrusion means and extrusion coating an outer surface of said inner tube with an even coating of said foam-core layer having a density of about 0.015 to 0.4 g./c.c.,
C. conveying said inner tube, coated with said foam-core layer, through a third extrusion means and extrusion forming said outer tube wall in contact with and bonded to said foam-core layer providing a plastic double-walled, foam-core conduit, wherein step (A) and step (C) are carried out with extrusion at a melt temperature of about 185° to 260° C. and a pressure of about 60 to 204 atm.

15. A process for the extrusion forming of a double-walled, foam-core conduit having generally concentric inner and outer plastic tube walls evenly spaced apart and bonded by a foam-core layer, said conduit including said tube walls and said foam core layer being formed from a plastic that is a thermoplastic, said process comprising the continuous and sequential steps of:
A. extrusion forming said inner tube wall in a first extrusion means,
B. conveying said inner tube through a second extrusion means and extrusion coating an outer surface of said inner tube with an even coating of said foam-core layer having a density of about 0.015 to 0.4 g./c.c.,
C. conveying said inner tube, coated with said foam-core layer, through a third extrusion means and extrusion forming said outer tube wall in contact with and bonded to said foam-core layer providing a plastic double-walled, foam-core conduit, wherein step (C) is carried out by extruding a melt of said plastic through an open channel of a third die of said third extrusion means having the general shape of said profile while passing simultaneously said inner tube, having said foam-core layer in place, through the open channel of said third die, extrusion forming said plastic melt as said outer tube in contact with said foam-core layer, said outer tube being generally evenly spaced apart from said inner tube by said foam-core layer providing a double-walled, foam-core conduit, wherein said outer tube is sized by a third vacuum sizing means.

16. A process for the extrusion forming of a double-walled, foam-core conduit having generally concentric inner and outer plastic tube walls evenly spaced apart and bonded by a foam-core layer, said conduit including said tube walls and said foam core layer being formed from a plastic that is a thermoplastic, said process comprising the continuous and sequential steps of:
A. extrusion forming said inner tube wall in a first extrusion means,
B. conveying said inner tube through a second extrusion means and extrusion coating an outer surface of said inner tube with an even coating of said foam-core layer having a density of about 0.015 to 0.4 g./c.c.,
C. conveying said inner tube, coated with said foam-core layer, through a third extrusion means and extrusion forming said outer tube wall in contact with and bonded to said foam-core layer providing a plastic double-walled, foam-core conduit, wherein step (B) is carried out by, extruding a melt of said plastic, having present a blowing agent, through an open channel of a second die of said second extrusion means as a foamed extrudate while passing simultaneously said inner tube through said second die, coating the outer surface of said inner tube evenly with said foamed extrudate as said foam-core layer followed by sizing and cooling said foam-core layer.

17. A process of claim 16 wherein said open channel of said second die has a first fixed mandrel centrally disposed therein, said mandrel forming one face of said open channel, said first fixed mandrel having a centrally disposed opening running axially through said mandrel having the general shape of said inner tube for carrying said inner tube through said die, said first fixed mandrel extending partially through said die, such that said inner tube becomes a first moving mandrel, on exiting said first fixed mandrel, and is evenly coated with said foamed extrudate on passing through said second die.

18. A process of claim 17 wherein said foam-core layer is sized to be radially uniform in thickness concentric with said inner tube.

19. A process of claim 18 wherein said foam-core layer is sized with a second vacuum sizing means.

20. A process for the extrusion forming of a double-walled, foam-core conduit having generally concentric inner and outer plastic tube walls evenly spaced apart and bonded by a foam-core layer, said conduit including said tube walls and said foam core layer being formed from a plastic that is a thermoplastic, said process comprising the continuous and sequential steps of:
A. extrusion forming said inner tube wall in a first extrusion means,
B. conveying said inner tube through a second extrusion means and extrusion coating an outer surface of said inner tube with an even coating of said foam-core layer having a density of about 0.015 to 0.4 g./c.c.,
C. conveying said inner tube, coated with said foam-core layer, through a third extrusion means and extrusion forming said outer tube wall in contact with and bonded to said foam-core layer providing a plastic double-walled, foam-core conduit, wherein step (B) is carried out with extrusion at a melt temperature of about 125° to 250° C. and a pressure of about 60 to 270 atm.

21. A process for the extrusion forming of a double-walled, foam-core conduit having generally concentric inner and outer tube walls generally evenly spaced apart and bonded by a foam-core layer, said conduit including said tube walls and said foam core layer being formed from a plastic that is a thermoplastic, said process comprising the continuous and sequential steps of:

A. extrusion forming said inner tube wall in a first extrusion means,

B. conveying said inner tube through a second extrusion means and extrusion coating an outer surface of said inner tube with an even coating of said foam-core layer having a density of about 0.015 to 0.4 g./c.c., C. conveying said inner tube, coated with said foam-core layer, through a third extrusion means and extrusion forming said outer tube wall in contact with and bonded to said foam-core layer providing a plastic double-walled, foam-core conduit, wherein said plastic is selected from the group consisting of ABS, HIPS and polyvinyl chloride.

22. A process for the extrusion forming of a double-walled, foam-core conduit having generally concentric inner and outer plastic tube walls evenly spaced apart and bonded by a foam-core layer, said conduit including said tube walls and said foam core layer being formed from a plastic that is a thermoplastic, said process comprising the continuous and sequential steps of:

A. extrusion forming said inner tube wall in a first extrusion means,

B. conveying said inner tube through a second extrusion means and extrusion coating an outer surface of said inner tube with an even coating of said foam-core layer having a density of about 0.015 to 0.4 g./c.c., C. conveying said inner tube, coated with said foam-core layer, through a third extrusion means and extrusion forming said outer tube wall in contact with and bonded to said foam-core layer providing a plastic double-walled, foam-core conduit, wherein said inner tube is bonded to said foam-core layer in step (B) by coating the outer surface of said inner tube with an active solvent for said inner tube prior to conveying through said second extrusion means.

23. A process of claim 22 wherein said active solvent is methyl ethyl ketone, xylene, toluene, petroleum ether, hexane, pentane or mixtures thereof.

24. A process for the extrusion forming of a double-walled, foam-core conduit having generally concentric inner and outer plastic tube walls evenly spaced apart and bonded by a foam-core, said conduit including said tube walls and said foam core layer being formed from a plastic that is a thermoplastic, said process comprising the continuous and sequential steps of:

A. extrusion forming said inner tube wall in a first extrusion means,

B. conveying said inner tube through a second extrusion means and extrusion coating an outer surface of said inner tube with an even coating of said foam-core layer having a density of about 0.015 to 0.4 g./c.c., C. conveying said inner tube, coated with said foam-core layer, through a third extrusion means and extrusion forming said outer tube wall in contact with and bonded to said foam-core layer providing a plastic double-walled, foam-core conduit, wherein said inner tube is bonded to said foam-core layer in step (B) by heating the outside surface of said inner tube prior to coating with said foam-core layer.

* * * * *